United States Patent
Kawata et al.

(10) Patent No.: US 11,533,444 B2
(45) Date of Patent: Dec. 20, 2022

(54) IMAGE PROCESSING DEVICE

(71) Applicant: FUJIFILM BUSINESS INNOVATION CORP., Tokyo (JP)

(72) Inventors: Yuichi Kawata, Kanagawa (JP); Kensuke Okamoto, Kanagawa (JP); Hideki Yamasaki, Kanagawa (JP); Yoshifumi Bando, Kanagawa (JP); Tomoyo Nishida, Kanagawa (JP); Ryoko Saitoh, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 485 days.

(21) Appl. No.: 16/027,712

(22) Filed: Jul. 5, 2018

(65) Prior Publication Data
US 2019/0028659 A1    Jan. 24, 2019

(30) Foreign Application Priority Data
Jul. 19, 2017   (JP) .............................. JP2017-139637

(51) Int. Cl.
*H04N 5/33*     (2006.01)
*H04N 5/238*    (2006.01)
(Continued)

(52) U.S. Cl.
CPC ........... *H04N 5/332* (2013.01); *G06V 40/166* (2022.01); *H04N 1/00251* (2013.01); *H04N 1/442* (2013.01); *H04N 1/4433* (2013.01); *H04N 5/238* (2013.01); *H04N 5/2355* (2013.01); *H04N 5/2356* (2013.01);
(Continued)

(58) Field of Classification Search
None
See application file for complete search history.

(56) References Cited

U.S. PATENT DOCUMENTS

| | | | | |
|---|---|---|---|---|
| 8,411,909 B1* | 4/2013 | Zhao | .................. | G06K 9/00899 382/116 |
| 8,441,548 B1* | 5/2013 | Nechyba | ............ | H04N 5/23254 348/222.1 |

(Continued)

FOREIGN PATENT DOCUMENTS

| | | |
|---|---|---|
| CN | 101021898 A | 8/2007 |
| CN | 101119679 A | 2/2008 |

(Continued)

OTHER PUBLICATIONS

Jul. 1, 2021 Office Action issued in Chinese Patent Application No. 201810310835.5.
(Continued)

*Primary Examiner* — Brian P Yenke
(74) *Attorney, Agent, or Firm* — Oliff PLC

(57) ABSTRACT

An image processing device includes: a measuring unit that measures a light quantity; an identification unit that identifies a region within an image-capturing range using the measured light quantity, the region having a light quantity higher than or equal to a predetermined light quantity; a setting unit that sets an image-capturing angle so that the identified region is out of the image-capturing range; and an image-capturing unit that captures an image for authentication at the image-capturing angle set by the setting unit.

6 Claims, 11 Drawing Sheets

(51) Int. Cl.
*H04N 5/235* (2006.01)
*H04N 1/00* (2006.01)
*H04N 1/44* (2006.01)
*G06K 9/00* (2022.01)
*H04N 5/232* (2006.01)
*G06V 40/16* (2022.01)

(52) U.S. Cl.
CPC ..... *H04N 5/23219* (2013.01); *H04N 5/23222* (2013.01); *H04N 5/33* (2013.01); *G06V 40/172* (2022.01)

(56) References Cited

U.S. PATENT DOCUMENTS

| | | | | |
|---|---|---|---|---|
| 8,457,367 | B1* | 6/2013 | Sipe | G06K 9/00315 |
| | | | | 382/118 |
| 8,542,879 | B1* | 9/2013 | Nechyba | G06K 9/00228 |
| | | | | 382/103 |
| 8,856,541 | B1* | 10/2014 | Chaudhury | G06K 9/00912 |
| | | | | 713/186 |
| 8,977,009 | B2* | 3/2015 | Jo | G06V 40/13 |
| | | | | 382/283 |
| 9,280,702 | B2* | 3/2016 | Niinuma | G06V 40/166 |
| 10,452,897 | B1* | 10/2019 | Benkreira | G06V 40/168 |
| 10,504,096 | B1* | 12/2019 | Hafemann | G06F 21/86 |
| 10,586,351 | B1* | 3/2020 | Brailovskiy | G06T 7/90 |
| 10,587,813 | B2* | 3/2020 | Qian | F16M 11/041 |
| 2006/0098103 | A1* | 5/2006 | Park | H04N 5/238 |
| | | | | 348/E5.04 |
| 2007/0257995 | A1* | 11/2007 | Horowitz | G03B 7/099 |
| | | | | 348/E5.04 |
| 2008/0106637 | A1* | 5/2008 | Nakao | H04N 5/23219 |
| | | | | 348/371 |
| 2008/0199056 | A1* | 8/2008 | Tokuse | H04N 5/23219 |
| | | | | 382/118 |
| 2009/0073275 | A1* | 3/2009 | Awazu | G03B 15/02 |
| | | | | 348/222.1 |
| 2009/0160970 | A1* | 6/2009 | Fredlund | H04N 5/235 |
| | | | | 348/229.1 |
| 2010/0254693 | A1 | 10/2010 | Yamashita | |
| 2012/0229487 | A1* | 9/2012 | Samanta | G09G 5/00 |
| | | | | 345/582 |
| 2013/0011015 | A1* | 1/2013 | Jo | G06V 40/13 |
| | | | | 382/103 |
| 2013/0141734 | A1 | 6/2013 | Aoki | |
| 2013/0222533 | A1 | 8/2013 | Maeda | |
| 2013/0267204 | A1* | 10/2013 | Schultz | H04W 12/06 |
| | | | | 455/411 |
| 2014/0211036 | A1* | 7/2014 | Aoki | H04N 5/2354 |
| | | | | 348/222.1 |
| 2014/0241593 | A1* | 8/2014 | Koseki | G06V 40/16 |
| | | | | 382/118 |
| 2015/0264267 | A1 | 9/2015 | Park et al. | |
| 2016/0063235 | A1* | 3/2016 | Tussy | G06K 9/22 |
| | | | | 726/6 |
| 2016/0133071 | A1* | 5/2016 | Henderson | E05B 47/0001 |
| | | | | 70/277 |
| 2016/0142681 | A1* | 5/2016 | Yu | G08B 13/19617 |
| | | | | 348/143 |
| 2016/0267319 | A1* | 9/2016 | Murillo | G06V 40/166 |
| 2016/0378788 | A1* | 12/2016 | Panneer | G11B 27/28 |
| | | | | 382/118 |
| 2017/0006226 | A1* | 1/2017 | Chino | H04N 5/2256 |
| 2017/0140221 | A1* | 5/2017 | Ollila | G02B 27/58 |
| 2017/0280045 | A1* | 9/2017 | Nonaka | G03B 37/02 |
| 2018/0045867 | A1* | 2/2018 | Kunugise | G06T 5/50 |
| 2018/0068110 | A1* | 3/2018 | Watanabe | G06F 21/32 |
| 2018/0097972 | A1* | 4/2018 | Bourret | G06K 9/6267 |
| 2018/0182111 | A1* | 6/2018 | Shinohara | H05B 47/125 |
| 2018/0270425 | A1* | 9/2018 | Li | H04N 5/23296 |
| 2018/0276468 | A1* | 9/2018 | Lee | G06V 30/142 |
| 2018/0285544 | A1* | 10/2018 | Chang | G06K 9/6292 |
| 2018/0315166 | A1* | 11/2018 | Noyes | G06T 7/50 |
| 2018/0349585 | A1* | 12/2018 | Ahn | G06F 21/35 |
| 2018/0357871 | A1* | 12/2018 | Siminoff | G08B 3/10 |
| 2019/0005217 | A1* | 1/2019 | Kim | G06K 9/6269 |
| 2019/0012541 | A1* | 1/2019 | Zhou | G06K 9/00604 |
| 2019/0073543 | A1* | 3/2019 | Ichinose | G06V 40/103 |
| 2019/0266414 | A1* | 8/2019 | Stawiszynski | G06V 20/53 |
| 2019/0342491 | A1* | 11/2019 | Mandavilli | H04N 5/23219 |
| 2020/0084386 | A1* | 3/2020 | Zheng | H04N 5/232 |
| 2020/0167456 | A1* | 5/2020 | Sato | G06T 1/00 |
| 2020/0184083 | A1* | 6/2020 | Asano | H04N 5/77 |
| 2020/0213524 | A1* | 7/2020 | Qian | H04N 5/225251 |
| 2020/0221977 | A1* | 7/2020 | Tanaka | G08B 21/0476 |
| 2021/0037163 | A1* | 2/2021 | Tanaka | G06V 40/50 |
| 2021/0165144 | A1* | 6/2021 | Yamazaki | G01N 21/21 |
| 2021/0174624 | A1* | 6/2021 | Haci | G07C 9/28 |
| 2021/0286980 | A1* | 9/2021 | Stawiszynski | G06V 20/56 |
| 2021/0289119 | A1* | 9/2021 | Dobashi | G06V 40/10 |
| 2022/0067343 | A1* | 3/2022 | Takahashi | G06T 1/00 |
| 2022/0070364 | A1* | 3/2022 | Inoue | H04N 5/23296 |
| 2022/0130173 | A1* | 4/2022 | Inoue | G06T 1/00 |
| 2022/0132023 | A1* | 4/2022 | Kagaya | G06V 40/50 |

FOREIGN PATENT DOCUMENTS

| | | |
|---|---|---|
| CN | 101909131 A | 12/2010 |
| CN | 103400108 A | 11/2013 |
| CN | 103942475 A | 7/2014 |
| CN | 104125400 A | 10/2014 |
| CN | 104917951 A | 9/2015 |
| CN | 205318544 U | 6/2016 |
| CN | 105915728 A | 8/2016 |
| CN | 106101567 A | 11/2016 |
| CN | 106125767 A * | 11/2016 |
| CN | 106125767 A | 11/2016 |
| JP | H08-0160507 A | 6/1996 |
| JP | 2007-156689 A | 6/2007 |
| JP | 2008-158597 A | 7/2008 |
| JP | 2016085248 A | 5/2016 |
| WO | 2016068057 A1 | 5/2016 |

OTHER PUBLICATIONS

Feb. 8, 2022 Office Action issued in Japanese Patent Application No. 2017-139637.
Aug. 3, 2021 Office Action issued in Japanese Application No. 2017-139637.
Jul. 4, 2022 Office Action issued in Japanese Application No. 2017-139637.
Nov. 27, 2020 Office Action issued in Chinese Patent Application No. 201810310835.5.

* cited by examiner

FIG. 2A
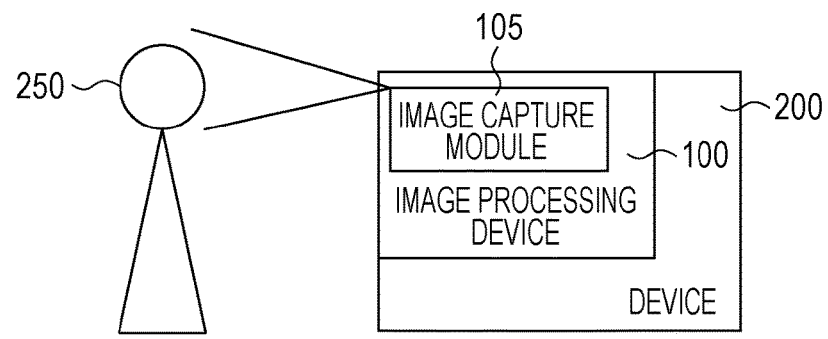
FIG. 2B1
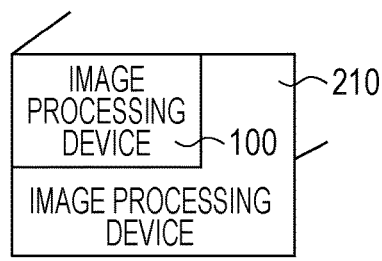
FIG. 2B2
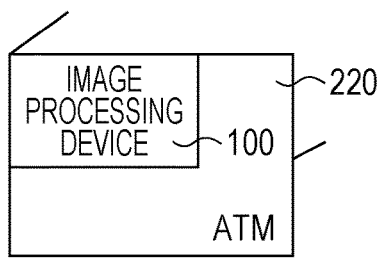
FIG. 2B3
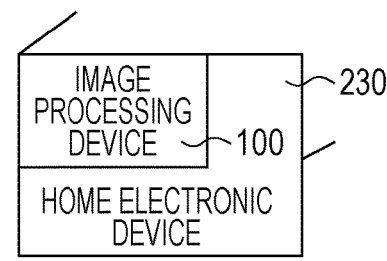

FIG. 5A1
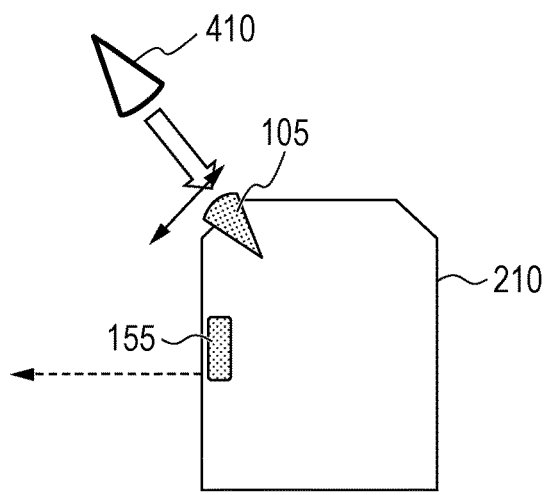
FIG. 5B1
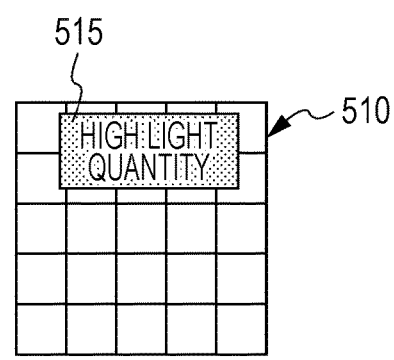
FIG. 5A2
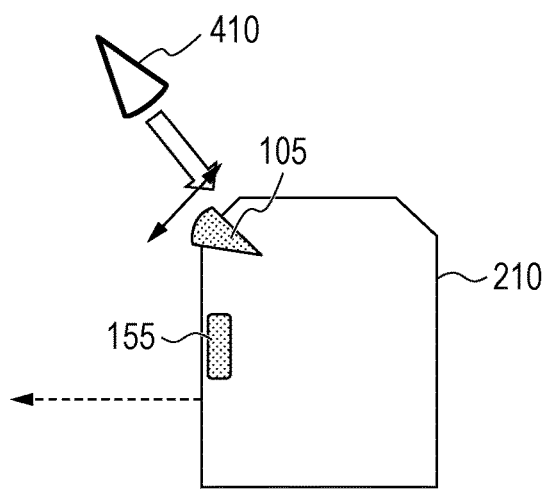
FIG. 5B2
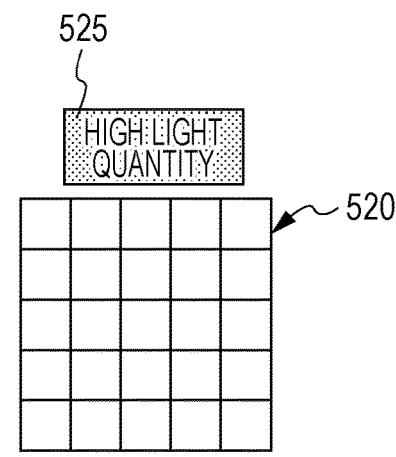

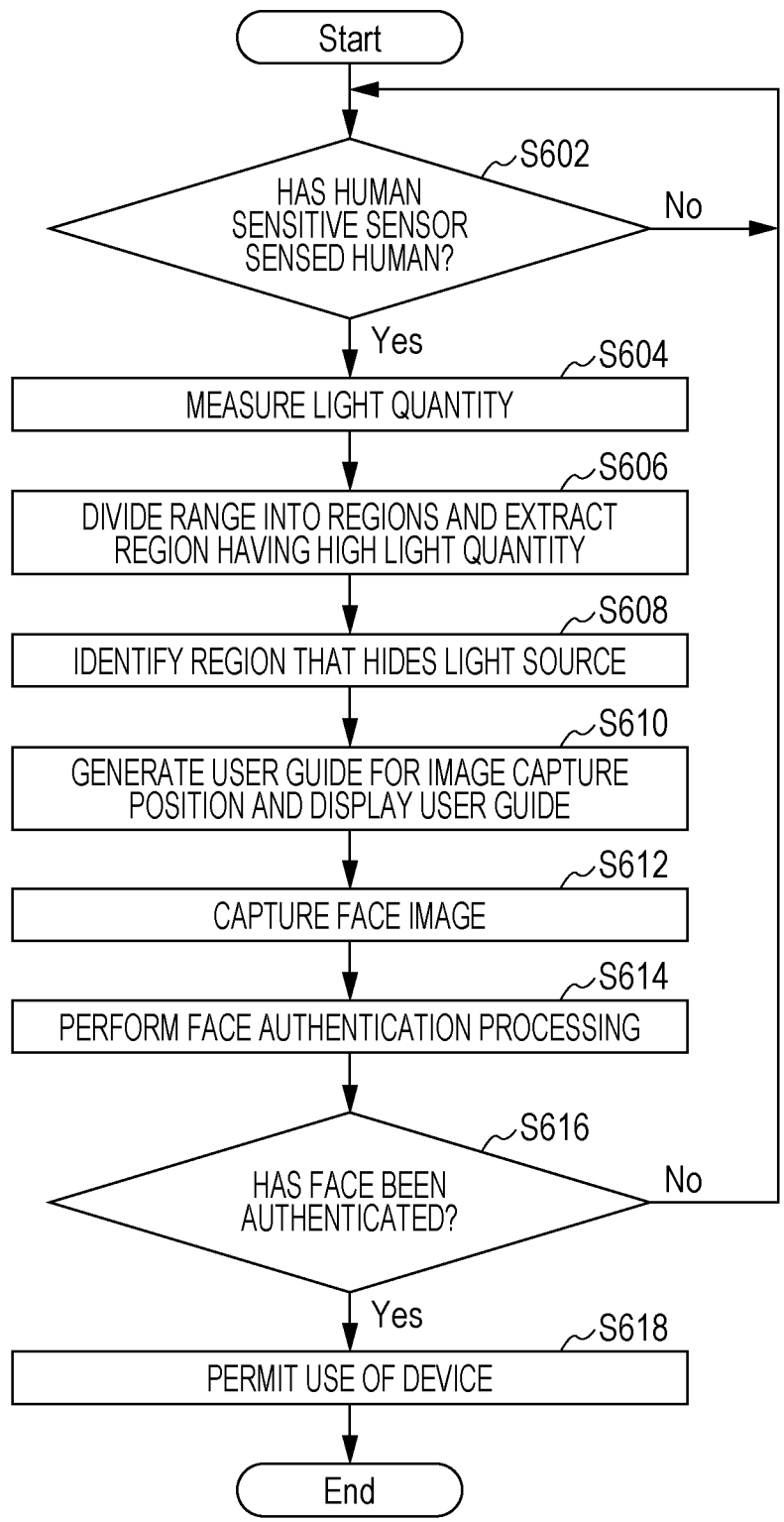

IMAGE PROCESSING DEVICE

CROSS-REFERENCE TO RELATED APPLICATIONS

This application is based on and claims priority under 35 USC 119 from Japanese Patent Application No. 2017-139637 filed Jul. 19, 2017.

BACKGROUND

Technical Field

The present invention relates to an image processing device.

SUMMARY

According to an aspect of the invention, there is provided an image processing device including: a measuring unit that measures a light quantity; an identification unit that identifies a region within an image-capturing range using the measured light quantity, the region having a light quantity higher than or equal to a predetermined light quantity; a setting unit that sets an image-capturing angle so that the identified region is out of the image-capturing range; and an image-capturing unit that captures an image for authentication at the image-capturing angle set by the setting unit.

BRIEF DESCRIPTION OF THE DRAWINGS

Exemplary embodiments of the present invention will be described in detail based on the following figures, wherein:

FIGS. 2A, 2B1 to 2B3 are each an explanatory diagram illustrating a system configuration example utilizing this exemplary embodiment;

FIG. 3 is a flowchart illustrating a processing example according to the first exemplary embodiment;

FIGS. 5A1 to 5B2 are each an explanatory diagram illustrating a processing example according to the first exemplary embodiment;

FIG. 6 is a flowchart illustrating a processing example according to the first exemplary embodiment;

DETAILED DESCRIPTION

First, before an exemplary embodiment is described, the basis of the exemplary embodiment and a device that utilizes the exemplary embodiment will be described. It is to be noted that the description is provided for the purpose of facilitating understanding of the exemplary embodiment. There are techniques that capture an image of a user and perform face authentication. Particularly in recent years, devices carrying a camera such as a monitoring camera of an automatic teller machine (ATM), a camera installed in a vending machine, and a camera for selecting an advertisement on signage are rapidly increasing in number, and a camera for face authentication is mounted in some image processing devices, such as a multifunctional device (an image processing device having functions of at least two of a scanner, a printer, a copier, and a facsimile). However, unlike a typical digital camera in which the position of the digital camera can be freely changed by a user who moves and takes a photograph, the above-mentioned cameras work at a fixed position in various environments (particularly, an office environment), and thus an image captured by a user using a camera may be darkened by backlight, or an image may be captured in an originally dark environment. For these reasons, the accuracy of face detection or face authentication may be reduced.

Figure 1:
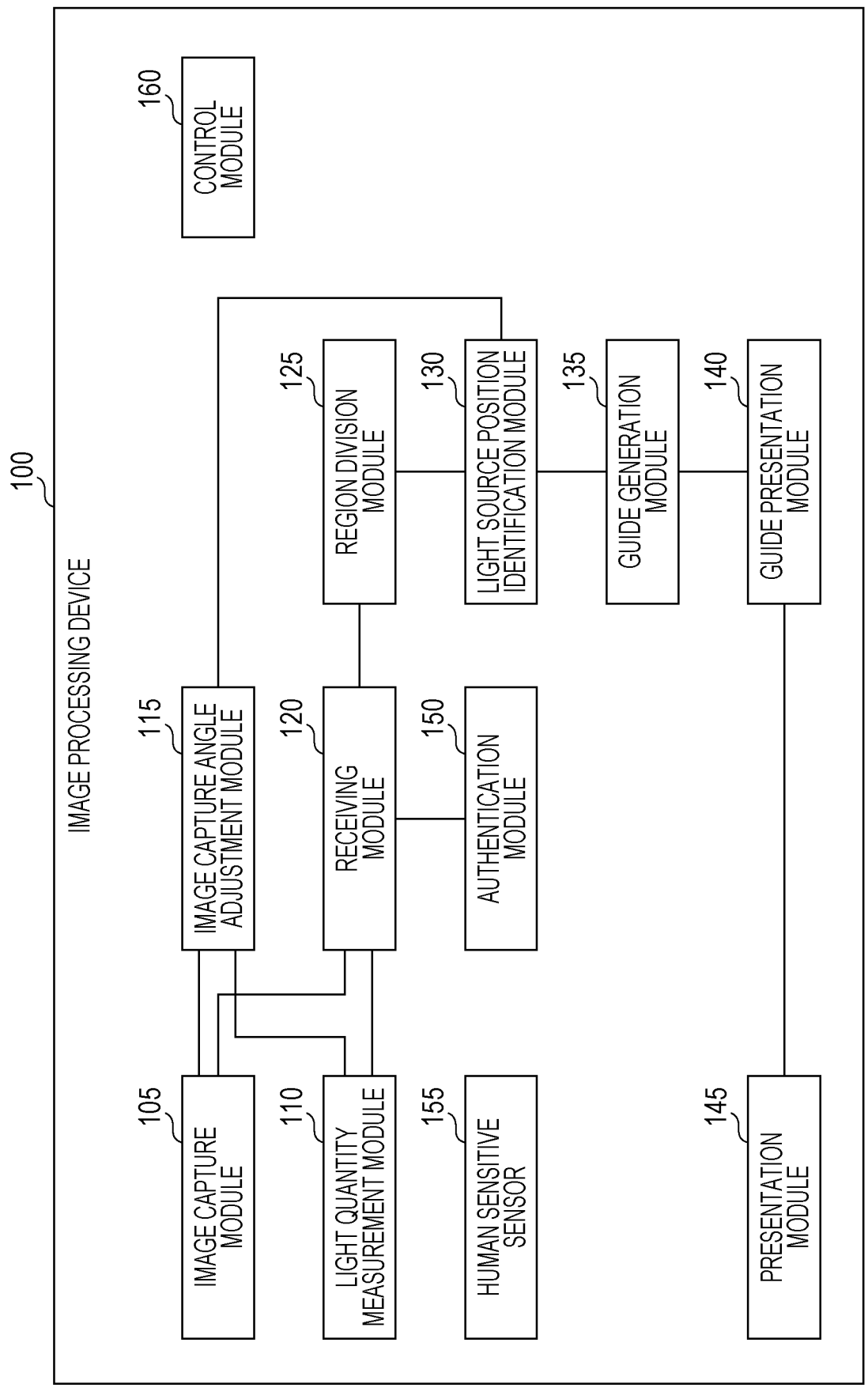
FIG. 1 is a conceptual module configuration diagram of a configuration example of a first exemplary embodiment.

Hereinafter, examples to implement various exemplary embodiments of the invention will be described with reference to the drawings. FIG. 1 illustrates a conceptual module configuration diagram of a configuration example of a first exemplary embodiment. It is to be noted that in general, a module indicates a component, such as logically separable software (computer program), or hardware. Therefore, the module in this exemplary embodiment refers to not only a module in a computer program, but also a module in a hardware configuration. Therefore, this exemplary embodiment also describes a computer program that implements the functions of those modules (a program that causes a computer to execute respective steps, a program that causes a computer to function as respective units, and a program to cause a computer to implement respective functions), a system, and a method. However, for the convenience of description, "store", "causes it to store", and words equivalent to these are used. When the exemplary embodiment is a computer program, these expressions indicate that "causing a storage device to store" or "perform control to cause a storage device to store". Although one-to-one correspondence may be established between the module and the function, one module may be configured by one program, or multiple modules may be configured by one program in implementation, and conversely, one module may be configured by multiple programs. Also, multiple modules may be executed by one computer, or one module may be executed by multiple computers in a distributed or parallel environment. It is to be noted that other modules may be included in one module. Hereinafter, "connection" is used not only for physical connection, but also for the case of logical connection (transfer of data, instructions, reference relationship between data). "Predetermined" refers to determined before target processing, and is used to naturally refer to determined before processing according to this exemplary embodiment. However, even after processing according to this exemplary embodiment, as long as before target processing is performed, "predetermined" refers to determined according to a situation and a state on that occasion, or according to a situation and a state before that occasion. When there are multiple "predetermined values", the values may be different from each other, or two or more values (needless to say, including all the values) may be the same. Also, phrase "in the case of A, B is performed" is used in the sense that "whether or not A is determined, and when A is determined to be true, B is performed". However, the case where determination of whether or not A is unnecessary is excluded. Also, when things are listed like "A, B, C", the expression indicates listing of examples unless otherwise stated, and includes the case where only one of the things is selected (for instance, only A is selected). Also, the system or the device may be implemented by one computer, hardware, or device, in addition to the configuration in which multiple computers, hardware, or devices are connected by means of communication such as a network (including one-to-one correspondence communication connection). The "device" and the "system" are used as the synonymous term. Needless to say, the "system" does not include a social "framework" (social system) which is human-made agreement. Also, for the processing by each module or when multiple types of processing are performed in a module, for each of the multiple types of processing, target information is read from a storage device, and after the processing is performed, a result of the processing is written to the storage device. Thus, a description of reading from a storage device before processing, and writing to the storage device after the processing may be omitted. It is to be noted that the storage device here may include a hard disk, a random access memory (RAM), an external storage medium, a storage device via a communication line, and a register in a central processing unit (CPU).

An image processing device 100 which is the first exemplary embodiment is for capturing (includes the concept of imaging) an image for authentication, and as illustrated in an example of FIG. 1, includes an image capture module 105, a light quantity measurement module 110, an image capture angle adjustment module 115, a receiving module 120, a region division module 125, a light source position identification module 130, a guide generation module 135, a guide presentation module 140, a presentation module 145, an authentication module 150, a human sensitive sensor 155, and a control module 160.

The image capture module 105 is connected to the image capture angle adjustment module 115 and the receiving module 120. The image capture module 105 captures an image for authentication with an image-capture angle set by the image capture angle adjustment module 115. The image capture module 105 may have the function of the light quantity measurement module 110. For instance, a digital camera having both functions of the image capture module 105 and the light quantity measurement module 110 may be utilized. In the illustration in the following description, the image capture module 105 and the light quantity measurement module 110 are integrated, and change of the image-capture angle of the image capture module 105 has the same meaning as change of the angle of the light quantity measurement module 110. The image capture module 105 is installed in a fixed device. Therefore, it is not possible to change the position of the image capture module 105 (that is, a fixed device) in order to avoid backlight. However, the image capture module 105 can change the image-capture angle. Specifically, as the image capture module 105, a digital camera, particularly, a tilt digital camera may be used. Alternatively, the image capture module 105 may capture an image after an image-capture position is presented by the guide presentation module 140.

The light quantity measurement module 110 is connected to the image capture angle adjustment module 115 and the receiving module 120. The light quantity measurement module 110 measures a light quantity. Also, similarly to the image capture module 105, the light quantity measurement module 110 can adjust the image-capture angle. The light quantity measurement module 110 changes the image-capture angle, and measures the light quantity for every change (after all, the light quantity is measured multiple times), and identifies an angle for which a high light quantity is not measured, then a face image may be captured by the image capture module 105 at the angle. The "high light quantity" is such a light quantity that when a face image is captured, the light source enters an image-capture range (so-called backlight), and a captured face image does not satisfy the quality desired for face authentication. Specifically, the "high light quantity" is a light quantity higher than or equal to a predetermined light quantity (for instance, a value obtained by multiplying the light quantity at the time of direct measurement of the light source by a predetermined value (a value less than or equal to 1)). Also, "a high light quantity is not measured" indicates a case where the light source does not enter an image-capture range. Specifically, as the light quantity measurement module 110, a light-quantum meter, and an illuminance meter may be used. The image capture module 105 may have the function of the light quantity measurement module 110. Specifically, it is also possible to measure a light quantity from an image-capture image provided that the luminosity of an image captured by the digital camera is the light quantity.

The image capture angle adjustment module 115 is connected to the image capture module 105, the light quantity measurement module 110, and the light source position identification module 130. The image capture angle adjustment module 115 changes the image-capture angle of the image capture module 105 or the light quantity measurement module 110. The image capture angle adjustment module 115 sets an image-capture angle according to the position identified by the light source position identification module 130 so that a high light quantity does not enter the image-capture range.

The receiving module 120 is connected to the image capture module 105, the light quantity measurement module 110, the region division module 125, and the authentication module 150. The receiving module 120 receives an image captured by the image capture module 105, and a light quantity measured by the light quantity measurement module 110. The receiving module 120 passes the image captured by the image capture module 105 or the light quantity measured by the light quantity measurement module 110 to the region division module 125, and passes the image captured by the image capture module 105 to the authentication module 150.

The region division module 125 is connected to the receiving module 120 and the light source position identification module 130. The region division module 125 divides the image captured by the image capture module 105 into regions. The light source position identification module 130 is connected to the image capture angle adjustment module 115, the region division module 125, and the guide generation module 135. The light source position identification module 130 identifies a region having a high light quantity, as the position of the light source by using the light quantity measured by the light quantity measurement module 110. Specifically, the light source position identification module 130 identifies a region having a high light quantity as the position of the light source in the image divided by the region division module 125 by using the light quantity.

The guide generation module 135 is connected to the light source position identification module 130 and the guide presentation module 140. The guide generation module 135 identifies the position of a subject (an operator to be authenticated) so that the region having a high light quantity identified by the light source position identification module 130 is hidden, and generates a guide that indicates an image-capture position of the subject according to the identified position. In other words, in order to prevent the light source from being seen in the image, an image for guiding the position of the subject is generated so that the subject hides the light source. For instance, a human shape may be generated at the position surrounding the light source. The guide presentation module 140 is connected to the guide generation module 135 and the presentation module 145. The guide presentation module 140 presents the guide generated by the guide generation module 135 on a display device. The guide presentation module 140 may display the guide so as to overlap the captured image. The subject looks at the image, and only has to move to a position at which the subject overlaps the guide. The presentation module 145 is connected to the guide presentation module 140. The presentation module 145 displays a captured image, the guide, and so on. The presentation module 145 is, for instance, a display device, such as a liquid crystal display. The authentication module 150 is connected to the receiving module 120. The authentication module 150 performs face authentication on an image received by the receiving module 120. An existing face authentication technique may be used. The human sensitive sensor 155 detects that an operator has approached the human sensitive sensor 155 (the image processing device 100). When approach of an operator is detected, image capture by the image capture module 105 or measurement by the light quantity measurement module 110 is started. For instance, there are an infrared sensor, an ultrasonic wave sensor, a visible light sensor, and a sensor combining these sensors. The control module 160 controls the modules in the image processing device 100, and performs face authentication on the image captured by the image capture module 105.

FIGS. 2A, 2B1 to 2B3 are each an explanatory diagram illustrating a system configuration example utilizing this exemplary embodiment. A device 200 has the image processing device 100. The image capture module 105 captures a user 250, and performs face authentication. When the face authentication is successful, the user 250 is allowed to use the device 200. Specifically, the device 200 is an image processing devices 210, such as a multifunctional device, an ATM 220, an air conditioner, and a home electronic device 230, such as a refrigerator. In each case, the image capture module 105 captures the user 250, and performs face authentication. The image processing device 210 has the image processing device 100. When the face authentication is successful, the user 250 is allowed to print, scan and so on using the image processing device 210. The ATM 220 has the image processing device 100. When the face authentication is successful, the user 250 is allowed to deposit in the ATM 220 and to withdraw the deposit. The home electronic device 230 has the image processing device 100. When the face authentication is successful, the user 250 is allowed to use the home electronic device 230. In addition, the image processing device 100 may be mounted in a vending machine, or a signage. For instance, face authentication is performed by a vending machine, and when an item is sold, payment may be made by the user. Also, face authentication is performed by a signage, and an advertisement suitable for the user may be displayed.

Figure 3:
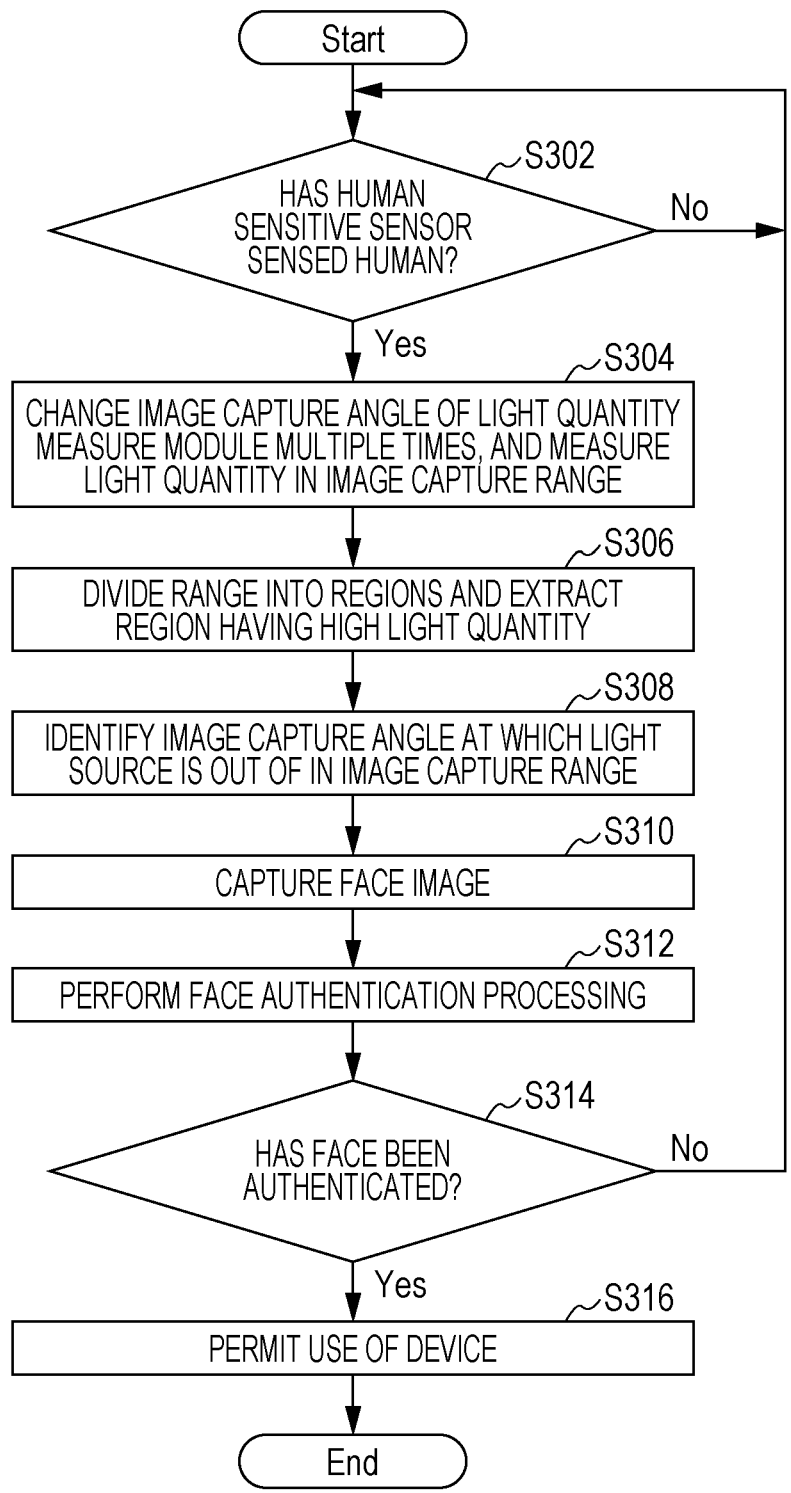
Figure 4:
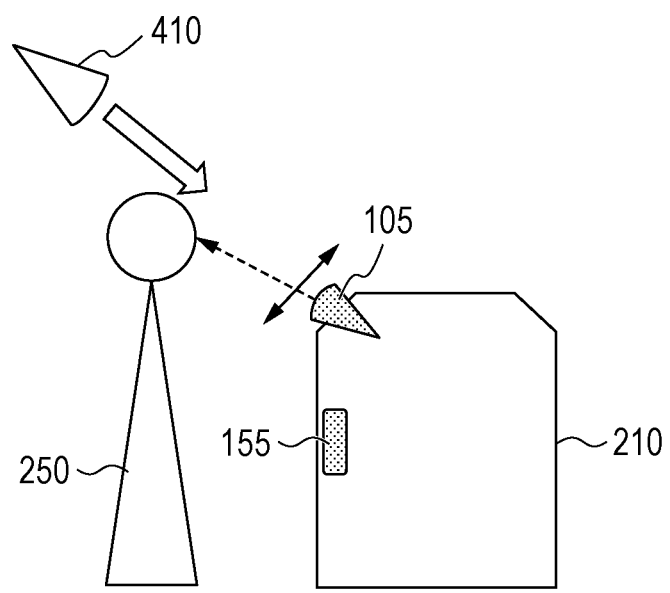
FIG. 4 is an explanatory diagram illustrating a processing example according to the first exemplary embodiment.

FIG. 3 is a flowchart illustrating a processing example according to the first exemplary embodiment. In step S302, the human sensitive sensor 155 determines whether or not a human is detected, and when a human is detected, the flow proceeds to step S304. Otherwise, the human sensitive sensor 155 stays on stand-by until a human is detected. For instance, as illustrated in FIG. 4, when it is detected that the user 250 has come in front of the image processing device 210 (the human sensitive sensor 155), the flow proceeds to the processing in step S304. In step S304, the image-capture angle of the light quantity measurement module 110 is changed multiple times, and the light quantity in each of those image-capture ranges is measured. For instance, as illustrated in FIG. 4, the image-capture angle is changed by moving the image capture module 105 (the light quantity measurement module 110) in upward and downward directions. Here, the image-capture angle may be changed not only in upward and downward directions, but also in rightward and leftward directions, or so-called 360-degree image-capture may be made possible by combining upward and downward as well as rightward and leftward. However, needless to say, the image processing device 210 is fixed, and the image capture module 105 is also fixed to the image processing device 210 (it is possible to change the image capture angle). Also, as a light source 410, lights (such as a fluorescent light, an LED) on the ceiling, a light stand of each desk, and a window or the like are provided, and when the user 250 is captured by the image capture module 105, backlight may occur. It is to be noted that when an image is captured with backlight, face authentication often fails even for the user 250 (the user 250 who has been registered as a user) who is allowed to use the image processing device 210.

In step S306, the region division module 125 divides the image-capture range into regions, and extracts a region having a high light quantity. As described above, it is sufficient that a region having a light quantity higher than or equal to a predetermined value be extracted. The light quantity in a region may be represented by a statistical value (such as an average value, a maximum value) of the light quantity in the region. For instance, as illustrated in FIG. 5A1, when the light source 410 is present in the image-capture direction of the image capture module 105, as illustrated in FIG. 5B1, a light quantity high region 515 which indicates the light source is present upward within an image-capture range 510. When the image-capture angle is reduced in the image capture module 105, as illustrated in FIG. 5A2, the image-capture direction of the image capture module 105 is displaced from the direction of light from the light source 410, and thus as illustrated in FIG. 5B2, a light quantity high region 525 indicating the light source is present upward of an image-capture range 520 (in short, the light quantity high region 525 is not present in the image-capture range 520). In step S308, an image-capture angle is identified, at which the light source is out of the image-capture range. In other words, the image-capture angle is identified so that "the region having a high light quantity" extracted in step S306 is out of the image-capture range. For instance, in step S304, an image-capture angle with the least light quantity among measured light quantities may be identified, or an image-capture angle which is highest and at which the light source is out of the image-capture range may be identified.

In the example of FIGS. 5A1 to 5B2, the image-capture angle illustrated in FIG. 5A2 is identified.

In step S310, the image capture module 105 captures a face image. The image capture module 105 is fixed at the image-capture angle identified in step S308, and the user 250 is captured. In step S312, the authentication module 150 performs face authentication processing. In step S314, the control module 160 determines whether or not the face is authenticated, and when the face is authenticated, the flow proceeds to step S316. Otherwise, the flow returns to step S302. In step S316, the control module 160 permits use of the device.

The processing in and after step S304 is performed, when the human sensitive sensor 155 detects a human, however, the processing may be performed at predetermined date/time when the device 200 is installed. For instance, the above-mentioned processing may be performed every predetermined hours (for instance, 2 hours), at the start of a workday (for instance, 9:00), at the start of afternoon work (for instance, 13:00), or at the start of an overtime work (for instance, 17:00). Also, when turn-on or turn-off of the power supply of the light source is detected, the processing in and after step S304 may be performed, or when raising or lowering of a blind (including a curtain) of a window is detected, the processing in and after step S304 may be performed. The detection may be performed by a physical switch provided in the light source or the blind.

FIG. 6 is a flowchart illustrating another processing example according to the first exemplary embodiment. In step S602, the human sensitive sensor 155 determines whether or not a human is detected, and when a human is detected, the flow proceeds to step S604. Otherwise, the human sensitive sensor 155 stays on stand-by until a human is detected. In step S604, the light quantity measurement module 110 measures a light quantity. In step S606, the region division module 125 divides the image-capture range into regions, and the light source position identification module 130 extracts a region having a high light quantity. In step S608, the guide generation module 135 identifies a region that hides the light source. In other words, a region including at least the region extracted in step S606 is identified. For instance, a region in a human shape is identified.

Figure 7:
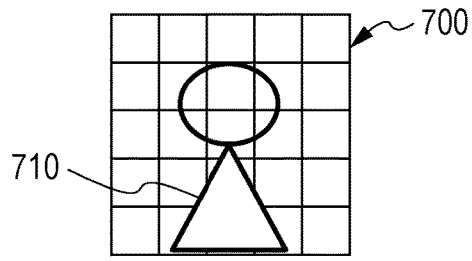
FIG. 7 is an explanatory diagram illustrating the processing example according to the first exemplary embodiment.

In step S610, the guide generation module 135 generates a user guide for the image-capture position, and the guide presentation module 140 displays the user guide. For instance, as illustrated in FIG. 7, an image capture position guide 710 is displayed on a screen 700 that displays the image-capture image. The image-capture position guide 710 is generated so as to hide the region identified in step S608. In step S612, the image capture module 105 captures a face image. In step S614, the authentication module 150 performs face authentication processing. In step S616, the control module 160 determines whether or not the face is authenticated, and when the face is authenticated, the flow proceeds to step S618. Otherwise, the flow returns to step S602. In step S618, the control module 160 permits use of the device.

The flowchart illustrated in the example of FIG. 3 and the flowchart illustrated in the example of FIG. 6 may be combined. Specifically, in step S308 of the flowchart illustrated in the example of FIG. 3, when it is determined that no image-capture angle is identified, at which the light source is out of the image-capture range (in other words, the light source is within the image-capture range at any image-capture angle), the processing in and after step S608 of the flowchart illustrated in the example of FIG. 6 may be performed.

Second Exemplary Embodiment

Figure 8:
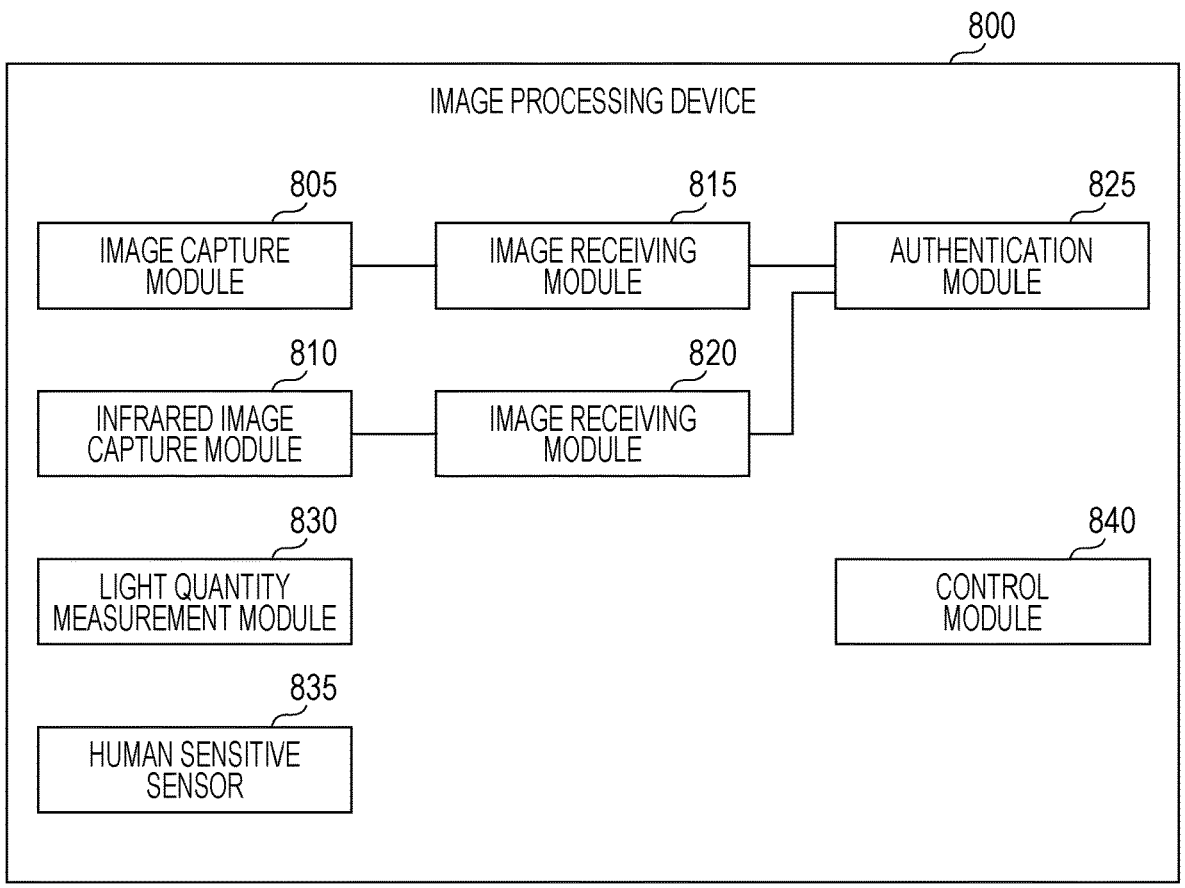
FIG. 8 is a conceptual module configuration diagram of a configuration example of a second exemplary embodiment.

FIG. 8 is a conceptual module configuration diagram of a configuration example of a second exemplary embodiment. An image processing device 800, which is the second exemplary embodiment, captures an image for authentication and performs authentication, and as illustrated in the example of FIG. 8, includes an image capture module 805, an infrared image capture module 810, an image receiving module 815, an image receiving module 820, an authentication module 825, a light quantity measurement module 830, a human sensitive sensor 835, and a control module 840. The image capture module 805 is connected to the image receiving module 815. The image capture module 805 captures an image for authentication. For instance, the image capture module 805 is a typical digital camera. The image capture module 805 does not capture an image using at least infrared light, but captures reflection light from a subject. The infrared image capture module 810 is connected to the image receiving module 820. The infrared image capture module 810 captures an image for authentication using infrared light. The infrared image capture module 810 is, for instance, an infrared camera. The image receiving module 815 is connected to the image capture module 805 and the authentication module 825. The image receiving module 815 receives an image captured by the image capture module 805, and passes the image to the authentication module 825 under the control of the control module 840. The image receiving module 820 is connected to the infrared image capture module 810 and the authentication module 825. The image receiving module 820 receives an image captured by the infrared image capture module 810, and passes the image to the authentication module 825 under the control of the control module 840.

The authentication module 825 is connected to the image receiving module 815 and the image receiving module 820. The authentication module 825 performs authentication using the image captured by the image capture module 805. Also, the authentication module 825 performs authentication using the image captured by the infrared image capture module 810. Authentication may be performed using either one of the image captured by the image capture module 805 and the image captured by the infrared image capture module 810 under the control of the control module 840. In addition, the authentication module 825 may perform authentication using the image captured by the image capture module 805, and may further perform authentication using the image captured by the infrared image capture module 810. When authentication is not successful by both images (when authentication using the image captured by the image capture module 805 has failed, and authentication using the image captured by the infrared image capture module 810 has failed), the authentication module 825 determines that the authentication has failed. When authentication is successful by either one of the images (when authentication using the image captured by the image capture module 805 is successful, or authentication using the image captured by the infrared image capture module 810 is successful), the authentication module 825 determines that the authentication is successful. As an image captured in advance for collation, an image captured by the image capture module 805 (or a digital camera similar to the image capture module 805) may be used, or an image captured by the infrared image capture module 810 (or an infrared camera similar to the infrared image capture module 810) may be used. Either one of the images may be used for collation, and when the image captured by the image capture module 805 is used, the former image may be used as the image for collation, and when the image captured by the infrared image capture module 810 is used, the latter image may be used as the image for collation.

The light quantity measurement module 830 measures a light quantity. The light quantity measurement module 830 is equivalent to the light quantity measurement module 110 illustrated in the example of FIG. 1, and may be formed integrally with the image capture module 805 or the infrared image capture module 810. The human sensitive sensor 835 detects that an operator has approached the human sensitive sensor 835 (the image processing device 800). When approach of an operator is detected, image capture by the image capture module 805 or the infrared image capture module 810 is started. For instance, there are an infrared sensor, an ultrasonic sensor, a visible light sensor, and a sensor combining these sensors. When the light quantity measured by the light quantity measurement module 830 is less than or equal to a predetermine value, the control module 840 performs control so that an image for authentication is captured using the infrared image capture module 810. Also, when the light quantity measured by the light quantity measurement module 830 is higher than or equal to the predetermine value, the control module 840 performs control so that an image for authentication is captured using the image capture module 805.

Figure 9:
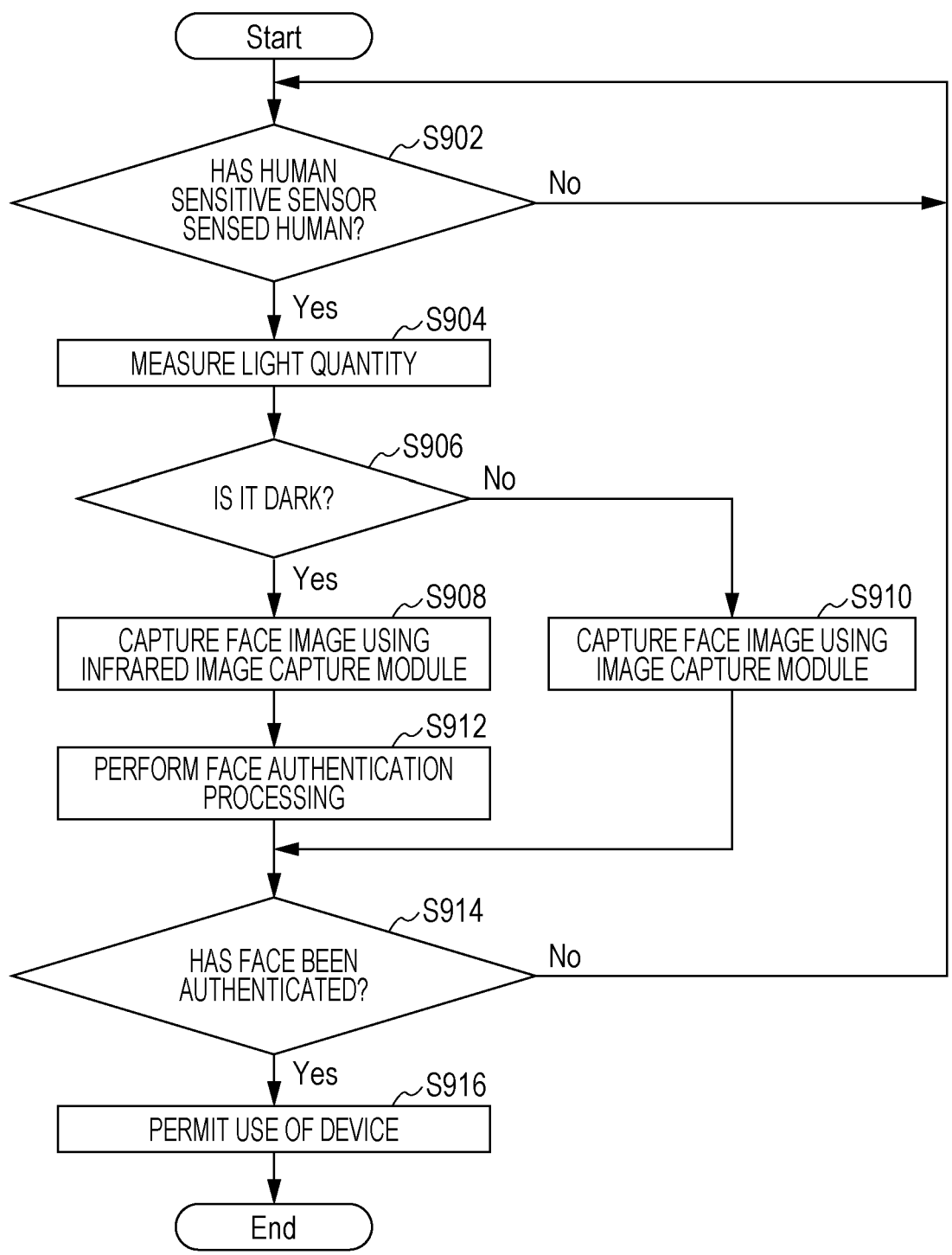
FIG. 9 is a flowchart illustrating a processing example according to the second exemplary embodiment.

FIG. 9 is a flowchart illustrating a processing example according to the second exemplary embodiment. In step S902, the human sensitive sensor 835 determines whether or not a human is detected, and when a human is detected, the flow proceeds to step S904. Otherwise, the human sensitive sensor 835 stays on stand-by until a human is detected. In step S904, the light quantity measurement module 830 measures a light quantity. In step S906, the light quantity measurement module 830 determines whether or not it is dark using the light quantity measured in step S904, and when it is dark, the flow proceeds to step S908. Otherwise, the flow proceeds to step S910. For instance, when the light quantity measured in step S904 is less than or equal to a predetermined threshold value, it may be determined that it is dark.

In step S908, a face image is captured using the infrared image capture module 810. In step S910, a face image is captured using the image capture module 805. In step S912, the authentication module 825 performs face authentication processing on either one of the images captured in step S908 and step S910. In step S914, the control module 840 determines whether or not a face is authenticated, and when the face is authenticated, the flow proceeds to step S916. Otherwise, the flow returns to step S902. In step S916, the control module 840 permits use of the device.

Figure 10:
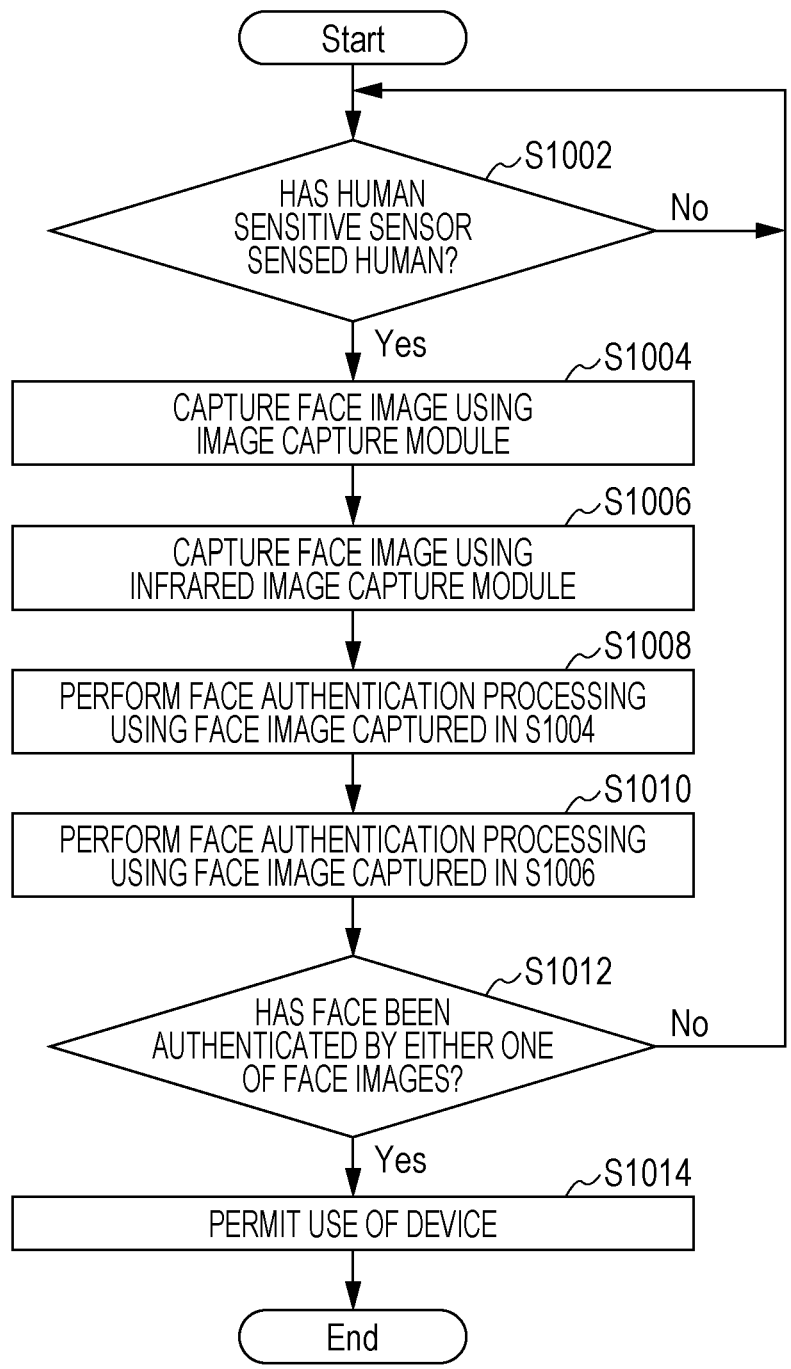
FIG. 10 is a flowchart illustrating a processing example according to the second exemplary embodiment.

FIG. 10 is a flowchart illustrating another processing example according to the second exemplary embodiment. In step S1002, the human sensitive sensor 835 determines whether or not a human is detected, and when a human is detected, the flow proceeds to step S1004. Otherwise, the human sensitive sensor 835 stays on stand-by until a human is detected. In step S1004, a face image is captured using the image capture module 805. In step S1006, a face image is captured using the infrared image capture module 810. In step S1008, the authentication module 825 performs face authentication processing using the face image captured in step S1004. In step S1010, the authentication module 825 performs face authentication processing using the face image captured in step S1006.

In step S1012, the control module 840 determines whether or not either face image can be authenticated, and when either face image can be authenticated, the flow proceeds to step S1014. Otherwise, the flow returns to step S1002. For instance, it may be determined whether or not either face image can be authenticated by using a higher one of scores indicating respective degrees of authentication. In step S1014, the control module 840 permits use of the device.

Figure 11:
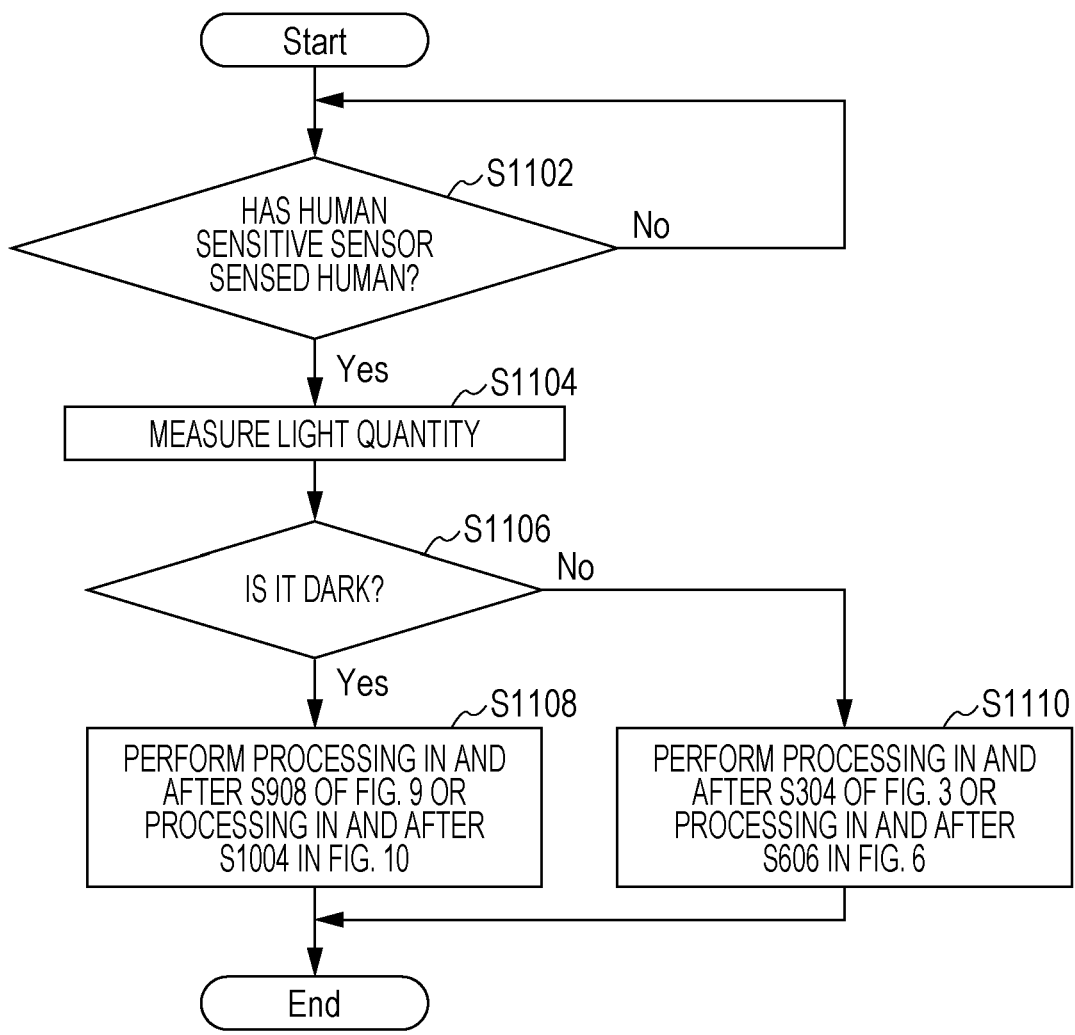
FIG. 11 is a flowchart illustrating a processing example according to the second exemplary embodiment.

FIG. 11 is a flowchart illustrating another processing example according to the second exemplary embodiment. This is a combination of the first exemplary embodiment (particularly, the flowchart illustrated in the example of FIG. 3 or 6) and the second exemplary embodiment (particularly, the flowchart illustrated in the example of FIG. 9 or 10). In step S1102, the human sensitive sensor 835 determines whether or not a human is detected, and when a human is detected, the flow proceeds to step S1104. Otherwise, the human sensitive sensor 835 stays on stand-by until a human is detected. In step S1104, the light quantity measure module 830 measures a light quantity. In step S1106, the light quantity measurement module 830 determines whether or not it is dark, and when it is dark, the flow proceeds to step S1108. Otherwise, the flow proceeds to step S1110. In step S1108, the processing in and after step S908 of FIG. 9 or the processing in and after step S1004 of FIG. 10 is performed. In step S1110, the processing in and after step S304 of FIG. 3 or the processing in and after step S606 of FIG. 6 is performed.

Figure 12:
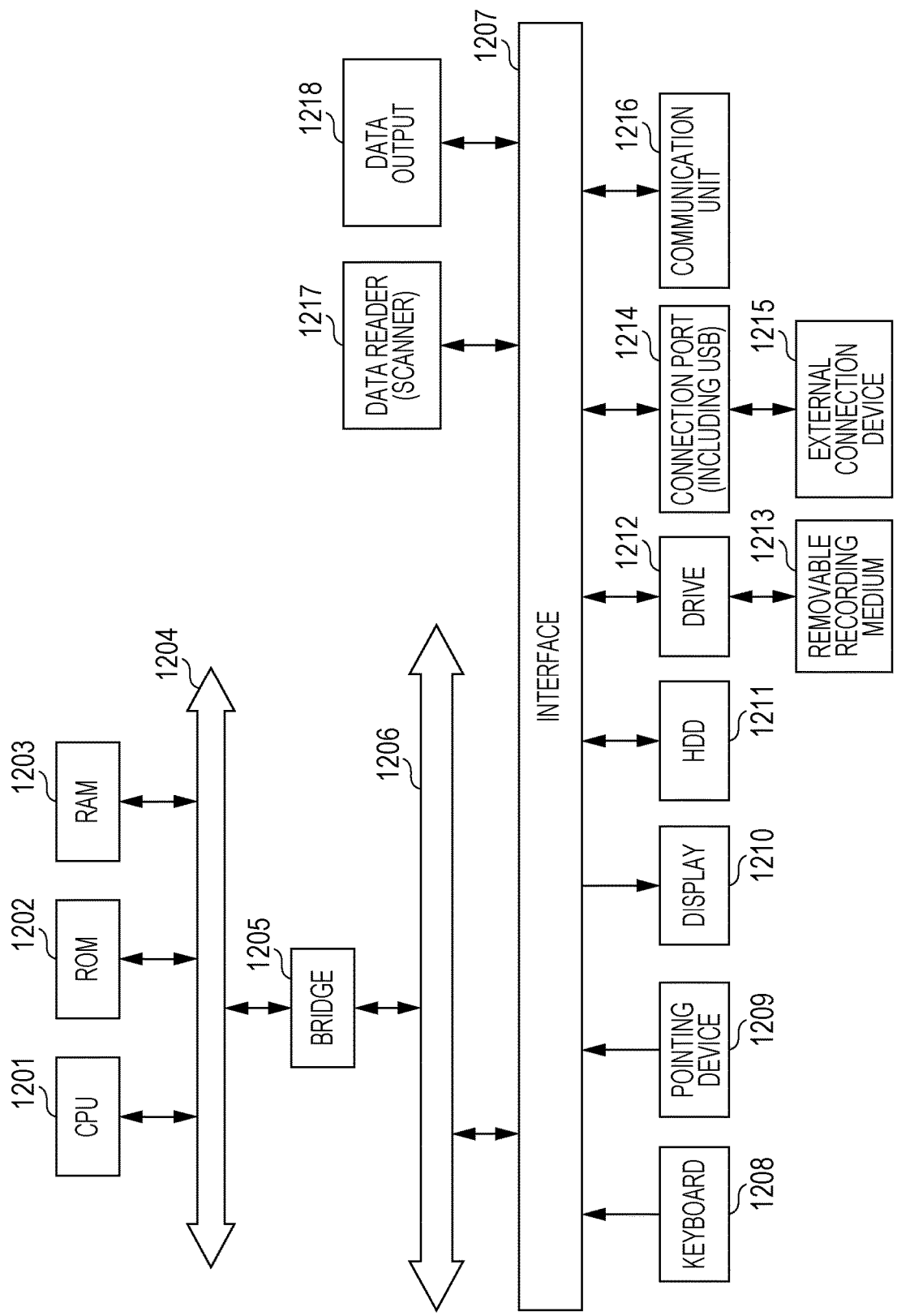
FIG. 12 is a block diagram illustrating a hardware configuration example of a computer that implements the exemplary embodiments.

Referring to FIG. 12, a hardware configuration example of the image processing device in this exemplary embodiment will be described. The configuration illustrated in FIG. 12 is configured by, for instance, a personal computer (PC), and indicates a hardware configuration example including a data reader 1217 such as a scanner, and a data output 1218 such as a printer.

A central processing unit (CPU) 1201 is a controller that executes the processing in accordance with a computer program which includes an execution sequence of each of the modules such as various modules explained in the above-described exemplary embodiment, that is, the image capture angle adjustment module 115, the receiving module 120, the region division module 125, the light source position identification module 130, the guide generation module 135, the guide presentation module 140, the authentication module 150, the control module 160, the image receiving module 815, the image receiving module 820, the authentication module 825, and the control module 840.

A read only memory (ROM) 1202 stores programs, calculation parameters, and so on used by the CPU 1201. A random access memory (RAM) 1203 stores programs used in the execution of the CPU 1201, and parameters which change as appropriate in the execution. These are connected to each other by a host bus 1204 that is configured by a CPU bus.

The host bus 1204 is connected to an external bus 1206, such as a peripheral component interconnect/interface (PCI) bus via a bridge 1205.

A pointing device 1209 such as a keyboard 1208 and a mouse is a device operated by an operator. A display 1210 is a liquid crystal display or a cathode ray tube (CRT), and displays various pieces of information as a text or image information. Alternatively, the display 1210 may be a touch screen or the like having both functions of the pointing device 1209 and the display 1210. In that case, regarding implementation of the function of the keyboard, without making physical connection like the keyboard 1208, a keyboard (what is called a software keyboard, or a screen keyboard) may be drawn on a screen (touch screen) by software to implement the function of the keyboard.

A hard disk drive (HDD) 1211 includes a built-in hard disk (may be a flash memory or the like), drives the hard disk, and records or reproduces a program executed by the CPU 1201, and information. The data for authentication (such as face images for collation, and characteristic quantities of face images) are stored in the hard disk. In addition, other various types of data, various computer programs are stored.

The drive 1212 reads data or a program recorded in a mounted removable recording medium 1213 such as a magnetic disk, an optical disk, a magneto-optical disk, or a semiconductor memory, and supplies the data or the program to the RAM 1203 connected to via the interface 1207, the external bus 1206, the bridge 1205, and the host bus 1204. It is to be noted that the removable recording medium 1213 can also be utilized as data recording region.

A connection port 1214 is a port that connects an external connection device 1215, and has connection part, such as a USB, an IEEE 1394 and the like. The connection port 1214 is connected to the CPU 1201 and others via the interface 1207, the external bus 1206, the bridge 1205, and the host bus 1204. The external connection device 1215 is the image capture module 105 (805) such as a digital camera, the infrared image capture module 810, the light quantity measurement module 110 (830), the human sensitive sensor 155 (835) such as an infrared sensor, and the presentation module 145 such as a liquid crystal display. The communication unit 1216 is connected to a communication line, and performs data communication processing with the outside. The data reader 1217 is, for instance, a scanner, and performs read processing for a document. The data output 1218 is, for instance, a printer, and performs output processing for document data.

It is to be noted that the hardware configuration of the image processing device illustrated in FIG. 12 depicts one configuration example, and this exemplary embodiment is not limited to the configuration illustrated in FIG. 12, and may be a configuration in which the modules explained in this exemplary embodiment be executable. For instance, part of the modules may be configurated by dedicated hardware (for instance, an application specific integrated circuit (ASIC)), and part of the modules may be in an external system and connected via a communication line. Furthermore, multiple systems, each of which is the system illustrated in FIG. 12, may be connected to each other via communication lines so that the multiple systems perform a coordinated operation. In particular, the modules may be incorporated in a mobile information communication device (including a mobile phone, a smartphone, a mobile device, a wearable computer, and so on), an information home appliance, a robot, a copier, a facsimile, a scanner, a printer, and a multifunctional device in addition to a personal computer.

It is to be noted that the above-described program may be stored in a recording medium and provided, and the program may be provided by means of communication. In this case, for instance, the above-described program may be regarded as an embodiment of "computer-readable recording medium on which a program is recorded". The "computer-readable recording medium on which a program is recorded" refers to a recording medium, which can be read by a computer and on which a program is recorded, used for installation, execution and distribution of a program. It is to be noted that the recording medium includes, for instance, "DVD-R, DVD-RW, DVD-RAM, and so on" and "DVD+R, DVD+RW, and so on" which are digital versatile disc (DVD), and standards defined by the DVD Forum, and DVD+RW Forum, a compact disk (CD) such as a read-only memory (CD-ROM) and a CD recordable (CD-R) and a CD rewritable (CD-RW), a blu-ray disc (Blu-ray (registered trademark) Disc), a magneto-optical disc (MO), a flexible disk (FD), a magnetic tape, a hard disk, a read-only memory (ROM), an electrically erasable programmable read-only memory (EEPROM (registered trademark)), a flash memory, a random access memory (RAM), and a secure digital (SD) memory card. Also, all or part of the above-described program may be recorded on the recording medium and saved or distributed. Also, all or part of the program may be transmitted by communication using a transmission medium, such as a wired network, a wireless communication network, or a combination of these, which are used, for instance, in a local area network (LAN), a metropolitan area network (MAN), a wide area network (WAN), an internet, an intranet, and an extranet, or the program may be carried by a carrier wave. In addition, the program may be part or all of another program, or the program along with another program may be recorded on a recording medium. Alternatively, the program may be divided and recorded on multiple recording media. Also, the program may be recorded in any form such as compressed or encrypted form as long as the program can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    a light quantity sensor;
    an image sensor; and
    a controller configured to:
    identify a region within an image-capturing range using a measured light quantity from the light quantity sensor, the region having a light quantity higher than or equal to a predetermined light quantity;
    set an image-capturing angle so that the identified region is out of the image-capturing range; and
    control the image sensor to capture an image for authentication at the image-capturing angle set by the controller so that the region having the light quantity higher than or equal to the predetermined light quantity is excluded from the image for authentication.

2. The image processing device according to claim 1, wherein the light quantity sensor and the image sensor are a same sensor.

3. The image processing device according to claim 1, wherein the light quantity sensor and the image sensor are a different sensor.

4. An image processing device comprising:
    a light quantity sensor;
    an image sensor; and
    a controller configured to:
    identify a region within an image-capturing range using a measured light quantity from the light quantity sensor, the region having a light quantity higher than or equal to a predetermined light quantity;
    identify a position of a subject so that the region is hidden, and present an image-capturing position of the subject according to the position of the subject so that the subject is away from the region having the light quantity higher than or equal to the predetermined light quantity; and
    control the image sensor to capture an image for authentication after the image-capturing position is presented so that the region having the light quantity higher than or equal to the predetermined light quantity is not in the image for authentication.

5. The image processing device according to claim 4, wherein the light quantity sensor and the image sensor are a same sensor.

6. The image processing device according to claim 4, wherein the light quantity sensor and the image sensor are a different sensor.

* * * * *